(12) United States Patent
Cros

(10) Patent No.: US 8,782,510 B2
(45) Date of Patent: Jul. 15, 2014

(54) CELL CONTENT SCROLLING

(75) Inventor: Jean Christophe Cros, Paris (FR)

(73) Assignee: Business Objects Software Limited, Dublin (IE)

(*) Notice: Subject to any disclaimer, the term of this patent is extended or adjusted under 35 U.S.C. 154(b) by 815 days.

(21) Appl. No.: 12/973,900

(22) Filed: Dec. 21, 2010

(65) Prior Publication Data

US 2012/0159302 A1 Jun. 21, 2012

(51) Int. Cl.
*G06F 17/00* (2006.01)
*G06F 17/24* (2006.01)

(52) U.S. Cl.
CPC ............ *G06F 17/245* (2013.01); *G06F 17/246* (2013.01)
USPC .......................................................... 715/217

(58) Field of Classification Search
CPC . G06F 17/246; G06F 17/212; G06F 17/2294; G06F 17/214
USPC .................................. 715/212, 217, 220, 244
See application file for complete search history.

(56) References Cited

U.S. PATENT DOCUMENTS

| 2006/0195784 | A1* | 8/2006 | Koivisto et al. | 715/523 |
|---|---|---|---|---|
| 2009/0319888 | A1* | 12/2009 | Oygard | 715/252 |
| 2010/0029340 | A1* | 2/2010 | Klassen et al. | 455/566 |
| 2012/0311487 | A1* | 12/2012 | Staikos et al. | 715/800 |

FOREIGN PATENT DOCUMENTS

WO   WO 98/06082 A1   2/1998

OTHER PUBLICATIONS

Hurst, N., Li, W., and Marriott, K.; Review of automatic document formatting; In Proceedings of the 9th ACM Symposium on Document Engineering (Munich, Germany, Sep. 16-18, 2009)—DocEng 2009; ACM New York, NY, USA; 2009 (http://portal.acm.org/ft_gateway.cfm?id=1600217&type=pdf&CFID=7526744&CFTOKEN=20427025).

Anderson, R. J. and Sobti, S.; The table layout problem; In Proceedings of the Fifteenth Annual Symposium on Computational Geometry (Miami Beach, Florida, United States, Jun. 13-16, 1999)—SCG '99; ACM New York, NY, USA; 1999 (http://portal.acm.org/ft_gateway.cfm?id=304937&type=pdf&CFID=7592333&CFTOKEN=31406247).

Hurst, N., Marriott, K., and Albrecht, D.; Solving the simple continuous table layout problem; In Proceedings of the 2006 ACM Symposium on Document Engineering (Amsterdam, The Netherlands, Oct. 10-13, 2006)—DocEng '06; ACM New York, NY, USA; 2006 (http://portal.acm.org/ft_gateway.cfm?id=1166169&type=pdf&CFID=7592333&CFTOKEN=31406247).

Bilauca, M. and Healy, P.; A new model for automated table layout; In Proceedings of the 10th ACM Symposium on Document Engineering (Manchester, United Kingdom, Sep. 21-24, 2010)—DocEng '10; ACM New York, NY, USA; 2010 (http://portal.acm.org/ft_gateway.cfm?id=1860594&type=pdf&CFID=7592333&CFTOKEN=31406247).

(Continued)

*Primary Examiner* — Adam M Queler

(57) ABSTRACT

Disclosed are methods and systems for cell content alignment. The methods and systems involve retrieving one or more table parameters, the one or more table parameters including size of currently invisible cells in a display window, size of merged cells, the display window size and text size in the merged cells, calculating a position of a text in a visible portion of merged cells based on the table parameters and displaying the text in the merged cells based on the calculated position of the text.

17 Claims, 12 Drawing Sheets

(56) References Cited

OTHER PUBLICATIONS

Yeung, T., Crossland, S., Lutteroth, C., and Weber, G.; The table widget reloaded: requirements, design and implementation; In Proceedings of the 11th International Conference of the NZ Chapter of the ACM Special Interest Group on Human-Computer Interaction on ZZZ (Auckland, New Zealand, Jul. 8-9, 2010)—CHINZ '10; ACM New York, NY, USA; 2010 (http://portal.acm.org/ft_gateway.cfm?id=1832853&type=pdf).

Jacobs, C., Li, W., Schrier, E., Bargeron, D., and Salesin, D.; Adaptive grid-based document layout; ACM Transactions on Graphics (TOG)—Proceedings of ACM SIGGRAPH 2003; ACM New York, NY, USA; 2003 (http://portal.acm.org/ft_gateway.cfm?id=882353&type=pdf&CFID=7592333&CFTOKEN=31406247).

Boards of Appeal of the European Patent Office; Decision of the Technical Board of Appeal dated Oct. 18, 2005 in Case No. T 0049/04-3.4.03 (EP Application No. 97935052.7); EPO, Board of Appeals; 2005 (http://legal.european-patent-office.org/dg3/pdf/t040049eu1.pdf).

* cited by examiner

| Year | Week | Quantity Sold | Sales Revenue |
|---|---|---|---|
| 2001 | 1 | 754 | $ 122,942 |
|  | 2 | 863 | $ 140,110 |
|  | 3 | 2,296 | $ 337,056 |
|  | 4 | 1,893 | $ 270,119 |
|  | 5 | 1,845 | $ 256,257 |
|  | 6 | 2,122 | $ 277,050 |
|  | 7 | 1,484 | $ 195,273 |
|  | 8 | 1,083 | $ 157,750 |
|  | 9 | 1,360 | $ 202,452 |
|  | 10 | 1,396 | $ 214,952 |
|  | 11 | 1,380 | $ 218,947 |
|  | 12 | 1,285 | $ 206,075 |
|  | 13 | 1,129 | $ 184,661 |
|  | 14 | 1,389 | $ 224,005 |
|  | 15 | 1,563 | $ 243,088 |
|  | 16 | 1,467 | $ 234,623 |
|  | 17 | 1,269 | $ 193,543 |
|  | 18 | 1,220 | $ 203,220 |

FIG. 1A

| | | | | |
|---|---|---|---|---|
| | | 2 | 863 | $ 140,110 |
| | | 3 | 2,296 | $ 337,056 |
| 2001 | | 4 | 1,893 | $ 270,119 |
| | | 5 | 1,845 | $ 256,257 |
| | | 6 | 2,122 | $ 277,050 |
| | | 7 | 1,484 | $ 195,273 |
| | | 8 | 1,083 | $ 157,750 |
| | | 9 | 1,360 | $ 202,452 |
| | | 10 | 1,396 | $ 214,952 |
| | | 11 | 1,380 | $ 218,947 |
| | | 12 | 1,285 | $ 206,075 |
| | | 13 | 1,129 | $ 184,661 |
| | | 14 | 1,389 | $ 224,005 |
| | | 15 | 1,563 | $ 243,088 |
| | | 16 | 1,467 | $ 234,623 |
| | | 17 | 1,269 | $ 193,543 |
| | | 18 | 1,220 | $ 203,220 |
| | | 19 | 1,055 | $ 172,186 |
| | | 20 | 1,106 | $ 182,675 |

FIG. 1B

| | | | |
|---|---|---|---|
| | 19 | 1,055 | $ 172,186 |
| | 20 | 1,106 | $ 182,675 |
| | 21 | 1,094 | $ 170,487 |
| | 22 | 886 | $ 137,047 |
| | 23 | 905 | $ 144,461 |
| | 24 | 823 | $ 130,281 |
| | 25 | 896 | $ 134,176 |
| | 26 | 735 | $ 108,901 |
| | 27 | 815 | $ 115,775 |
| | 28 | 1,007 | $ 141,767 |
| | 29 | 869 | $ 115,817 |
| 2001 | 30 | 626 | $ 78,889 |
| | 31 | 664 | $ 73,654 |
| | 32 | 701 | $ 76,933 |
| | 33 | 547 | $ 55,040 |
| | 34 | 432 | $ 41,783 |
| | 35 | 1,448 | $ 239,401 |
| | 36 | 3,820 | $ 541,111 |
| | 37 | 2,063 | $ 361,845 |

| | 110 | 120 | 125 | 130 | 135 | 105 |
|---|---|---|---|---|---|---|
| | | | 36 | 3,820 | $ 541,111 | |
| | | | 37 | 2,063 | $ 361,845 | |
| | | | 38 | 1,597 | $ 303,520 | |
| | | | 39 | 1,459 | $ 289,779 | |
| | | | 40 | 1,970 | $ 359,594 | |
| | | | 41 | 1,457 | $ 292,667 | |
| | | | 42 | 1,394 | $ 277,377 | |
| | | | 43 | 1,466 | $ 289,285 | |
| | | | 44 | 1,709 | $ 326,948 | |
| | | | 45 | 1,499 | $ 293,524 | |
| | | | 46 | 1,291 | $ 250,003 | |
| | | | 47 | 1,381 | $ 252,009 | |
| | | | 48 | 1,534 | $ 286,380 | |
| | | | 49 | 1,732 | $ 313,759 | 115 |
| | | | 50 | 1,618 | $ 303,125 | |
| | | | 51 | 1,805 | $ 331,143 | |
| | | | 52 | 1,613 | $ 285,524 | |
| | | 2001 | 53 | 1,875 | $ 324,782 | |
| | | 2002 | 1 | 2,207 | $ 337,056 | |

FIG. 1D

CELL CONTENT SCROLLING

FIELD

The field generally relates to computer user interfaces for displaying tabular data. More particularly, the field relates to cell alignments and cell content scrolling for displaying tabular data.

BACKGROUND

Data reports typically include data which is displayed in the form of a table. There may be instances where the table size is greater than the window size available to display the table on a computer user interface. In some instances, the table may include merged cells in one column or row which may be common in its correspondence to a plurality of cells in other columns or rows. Currently available techniques align the text in merged cells at the top of the merged cells or in the middle of the merged cells irrespective of the scroll bar position. When a user scrolls through the window to view the table, the text in the merged cells may not always be visible next to the corresponding data in cells of the other columns or rows. However, it would be desirable to display the text of the merged cells along with corresponding data in cells from other columns or rows.

SUMMARY

Various embodiments of systems and methods for cell content scrolling are described herein. The methods and systems involve retrieving one or more table parameters, the one or more table parameters including size of currently invisible cells in a display window, size of merged cells, the display window size and text size in the merged cells, calculating a position of a text in a visible portion of merged cells based on the table parameters and displaying the text in the merged cells based on the calculated position of the text.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments, together with their advantages, may be best understood from the following detailed description taken in conjunction with the accompanying drawings.

FIGS. 1A to 1D are block diagrams illustrating exemplary scenarios for displaying position of a text in a merged column based on a scroll bar position according to an embodiment.

DETAILED DESCRIPTION

Figure 2:
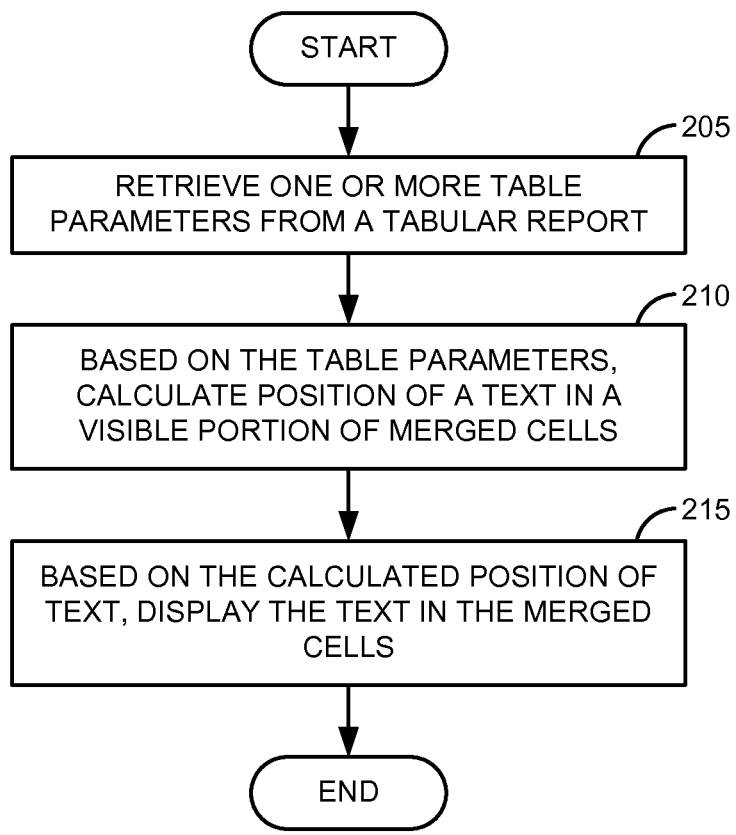
FIG. 2 is a flow diagram illustrating an exemplary method for displaying the text in the merged cells based on the position of a scroll bar according to an embodiment.

Embodiments of techniques for cell content scrolling are described herein. In the following description, numerous specific details are set forth to provide a thorough understanding of various embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Business Intelligence (BI) reports store data in the form of tables. The BI reports are generally large report documents including many fields or cells. In some instances, cells in the report are merged, the text in the merged cells may be common to other cells in the table. On scrolling the report, the text in the merged cells may have to be displayed according to the scrolled report. In order to achieve the function of the text being displayed throughout the report, a position of the text needs to be calculated. According to one embodiment, the position of the text is calculated based on table parameters. The table parameters may be size of invisible cells in a display window, size of cells, size of the text in the cells, size of display window, and the like. The text may be displayed in the merged cells according to a calculated position of the text. According to one embodiment, the text may be displayed in merged cells columns based on a scroll bar position. According to another embodiment, the text may be displayed in merged cells rows based on a scroll bar position.

According to yet another embodiment, the report may be scrolled by scrolling the text in the merged cells. As the text is moved in the merged cells, the calculated position of the text varies accordingly, to allow display of data in corresponding cells.

FIGS. 1A to 1D are block diagrams illustrating exemplary scenarios for displaying position of a text in a merged column based on a scroll bar position according to an embodiment. Consider a scenario 100, in FIG. 1A, including a window 105 displaying a table 110 associated with a report. The report may be scrolled by using a scroll bar 115. The table 110 includes columns "year"120, "week" 125, "quantity sold" 130 and "sales revenue" 135. Text "2001" in the merged cells column of column "year" 120 is displayed in the top portion of the merged cells column. The text "2001" corresponds to data in cells of columns 125, 130 and 135. In a scenario of a user scrolling the report using the scroll bar 115 to view the complete report or any other interaction like the keyboard navigation keys, the text "2001" may not be visible when the user has scrolled down a few cells of the report. According to one embodiment, in order to view the text "2001" throughout the portions of the report corresponding to the merged cells column of column 120, a position of the text may be calculated. On calculating the position of the text, the text may be displayed according to a user selection of the scroll bar. In this manner, the text is always displayed in the visible portion of the merged column.

FIG. 2 is a flow diagram illustrating an exemplary method for displaying the text in the merged cells according to the position of a scroll bar according to an embodiment. At process block 205 one or more table parameters are retrieved. In one embodiment, the one or more table parameters may be retrieved from a tabular report. The one or more table parameters may include position of the merged cell in the report, size of currently invisible cells, size of merged cells, size of the display window, the position of the visible portion of the report beyond the window and the size of the text in the merged cells. The table parameters may be associated with the vertically merged cells or horizontally merged cells. At process block 210 a position of the text is calculated to be displayed in a visible portion of merged cells. In one embodiment, table parameters are measured in pixels. At process block 215, based on its calculated position, the text in the merged cells is displayed with other corresponding data from other cells. In one embodiment, the text in the merged cells is displayed according to a position of the scroll bar.

According to an embodiment, the text position may be calculated for displaying text in merged cells column. When the text position is calculated for merged cells column, table parameters may be height of currently invisible cells, height of the merged cells column, height of the display window, height of the text in the column.

According to an embodiment, the text position may be calculated for displaying text in merged cells row. When the text position is calculated for merged cells row, table parameters may be width of currently invisible cells, width of the merged rows, width of the display window, width of the text in the row.

In one embodiment, the text in the merged cells itself may be used as a scroll bar. Scrolling the tabular report according to the position of the text in the merged cells includes scrolling according to a logical behavior of the text in the merged cells. The logical behavior of the text includes moving the tabular report up on scrolling the text down and vice versa in vertically merged cells column. The logical behavior of the text includes moving the tabular report from left to right on scrolling the text from right to left and vice versa in horizontally merged cells row.

Figure 3:
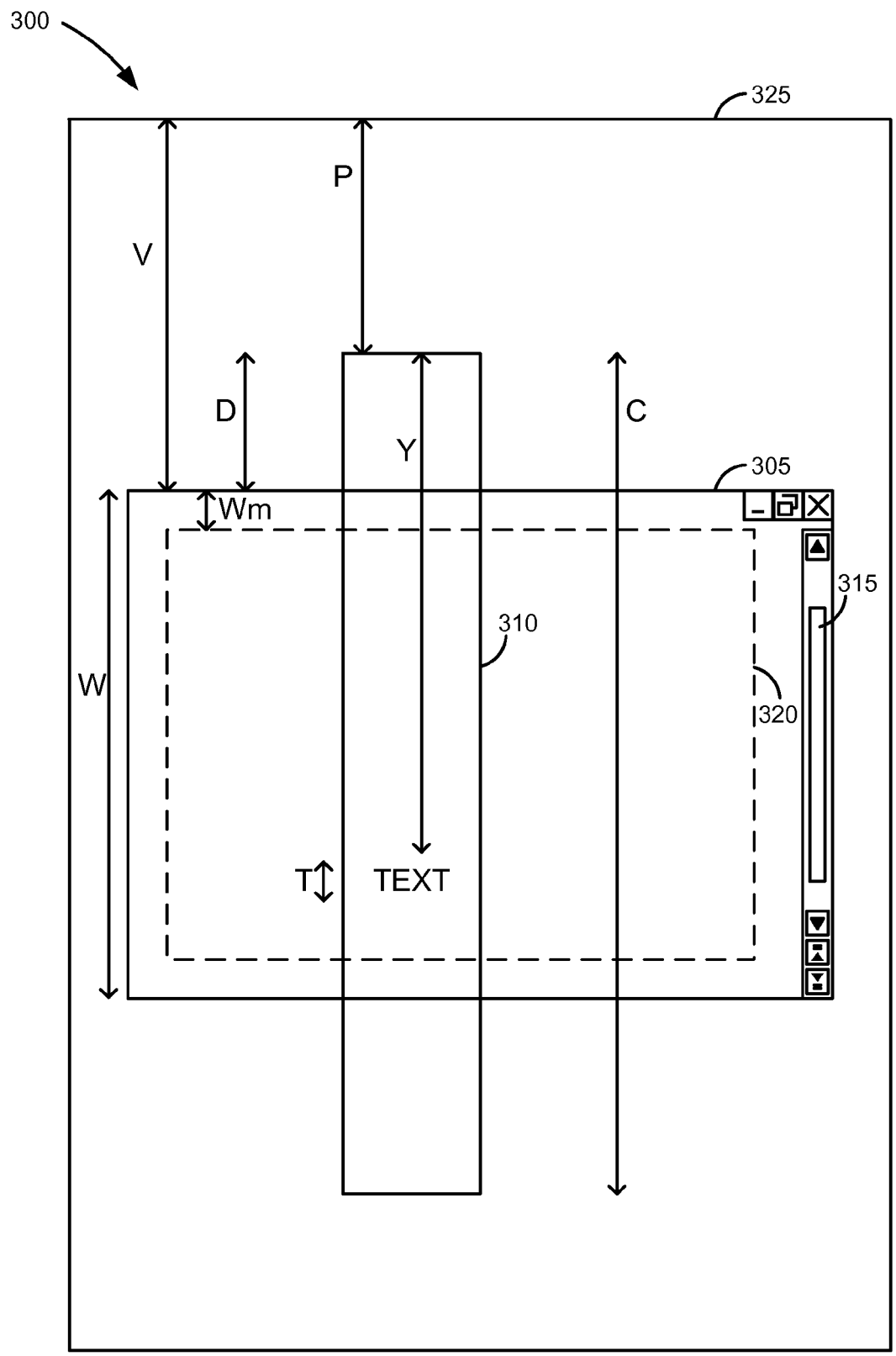
FIG. 3 is a block diagram illustrating exemplary table parameters and calculation of position of text according to an embodiment.

FIG. 3 is a block diagram illustrating exemplary table parameters and calculation of position of text in a merged column. The user interface (UI) display 300 includes a window 305, merged cells column 310 of a tabular report 325 and a scroll bar 315. The display 300 illustrates table parameters such as, the position of the tabular report above the display window 'V', the position of the merged cells column in the tabular report 'P', the height of the invisible cells above the window 'D', window height 'W', text height 'T', the margin of the scrolling area in the window 'Wm' denoted by 320 and height of merged cells column 'C'.

The position of the text "Y" is calculated by using table parameters as follows:

$$Y=(V-P+Wm)*(C-T)/(C-W+2Wm) \quad (1),$$

where
Y=position of text in the merged cells column
V=position of the tabular report above the display window
P=position of the merged cells column in the tabular report
C=height of merged cells column
T=height of text
W=height of window displaying the visible portion of the tabular report
Wm=margin of the scrolling area inside the display window According to one embodiment, the position of the text "Y" is proportional to the difference between position of the tabular report above the display window and the position of the merged cells column in the tabular report, as modified by the margin of the scrolling area. According to another embodiment, the position of the text "Y" is proportional to the difference between height of merged cells and height of text.

According to yet another embodiment, the position of the text "Y" is inversely proportional to the difference between height of merged cells and height of windows. This difference is modified by the margin of the scrolling area.

Consider an example of FIGS. 1A to 1D. In the scenario,
the display window height W is 19*20=380 pixels
the scrollable margin Wm=20 pixels
height of each cell in the table=20 pixels.
the position of the tabular report above the display window V is 100*20=2000 pixels
the position of the merged cell in the tabular report P=is 2020 pixels.
height of merged cells column in the report C=53*20=1060 pixels.

In FIG. 1A, the position of the tabular report above the display window 'V' is 2000 pixels. Substituting the values in the equation (1), $$Y=(2000-2020+20)(1060-20)/(1060-380+2*20)=0$$

Since the calculated position of the text is 0, the text is positioned at a top portion of the merged cells column.

In FIG. 1B, the user scrolls the report by scrolling the scroll bar 115. The user scrolls down by 2 cells. The position of the tabular report above the window 'V' accordingly changes from 2000 to 2040. The position of the visible portion of the merged cells column changes accordingly to 2040 pixels. As a result, the top of $3^{rd}$ row of the table is displayed at the top of the window.

Substituting the values in the equation (1), $$Y=(2040-2020+20)(1060-20)/(1060-380+2*20)$$
$$=57.77$$

The obtained result may be rounded to 58 for display. As shown in FIG. 1B, the merged cell text "2001" is displayed alongside the cell containing "week" 4, which is displayed at 60 pixels from the top of the merged cell as shown in FIG. 1B.

In FIG. 1C, the user continues to scroll down to view half of "week" 19. So, there is 18 and a half weeks hidden. So,
V−P=18.5*20=370 pixels $$V=2020+370=2390 \text{ pixels}$$

Substituting the values in the equation (1), $$Y=(2390-2020+20)(1060-20)/(1060-380+2*20)$$
$$=563.33 \text{ pixels.}$$

In FIG. 1C, the text is displayed at 563.33/20=28.16 cells from the top, so the text is displayed below "week" 29.

In FIG. 1D, the user scrolls down to "week" 36.

$$V-P=35*20=700 \text{ pixels}$$

$$V=2020+700=2720 \text{ pixels}$$

Substituting the values in the equation (1) results in Y=1040.

In FIG. 1D, the height of the merged cell is 1060 and the text height is 20 pixels. So the text "2001" is displayed at the bottom of the cell.

Consider a scenario where the text height is equivalent to 60 pixels and all the other table parameters are the same as above. Substituting the values in equation (1) results in 541.66. The position of the text associated with the week 27 (i.e. row 28) is 27*20=540. Here, the text is positioned at week 28 since the value of the calculated position of the text is closer to the position of week 28, than week 29.

In one embodiment, the text itself, positioned at week 31, may be used to scroll the report. Scrolling the report using the text accordingly scrolls the scroll bar 315. When the text positioned at week 31 is used to scroll the report, the table parameters are varied accordingly. Whenever the table parameters vary, the position of the text also varies.

According to another embodiment, the process described above may be used to calculate the position of the text in merged rows. According to yet another embodiment, the text in the merged rows may be used to scroll the report.

Figure 4:
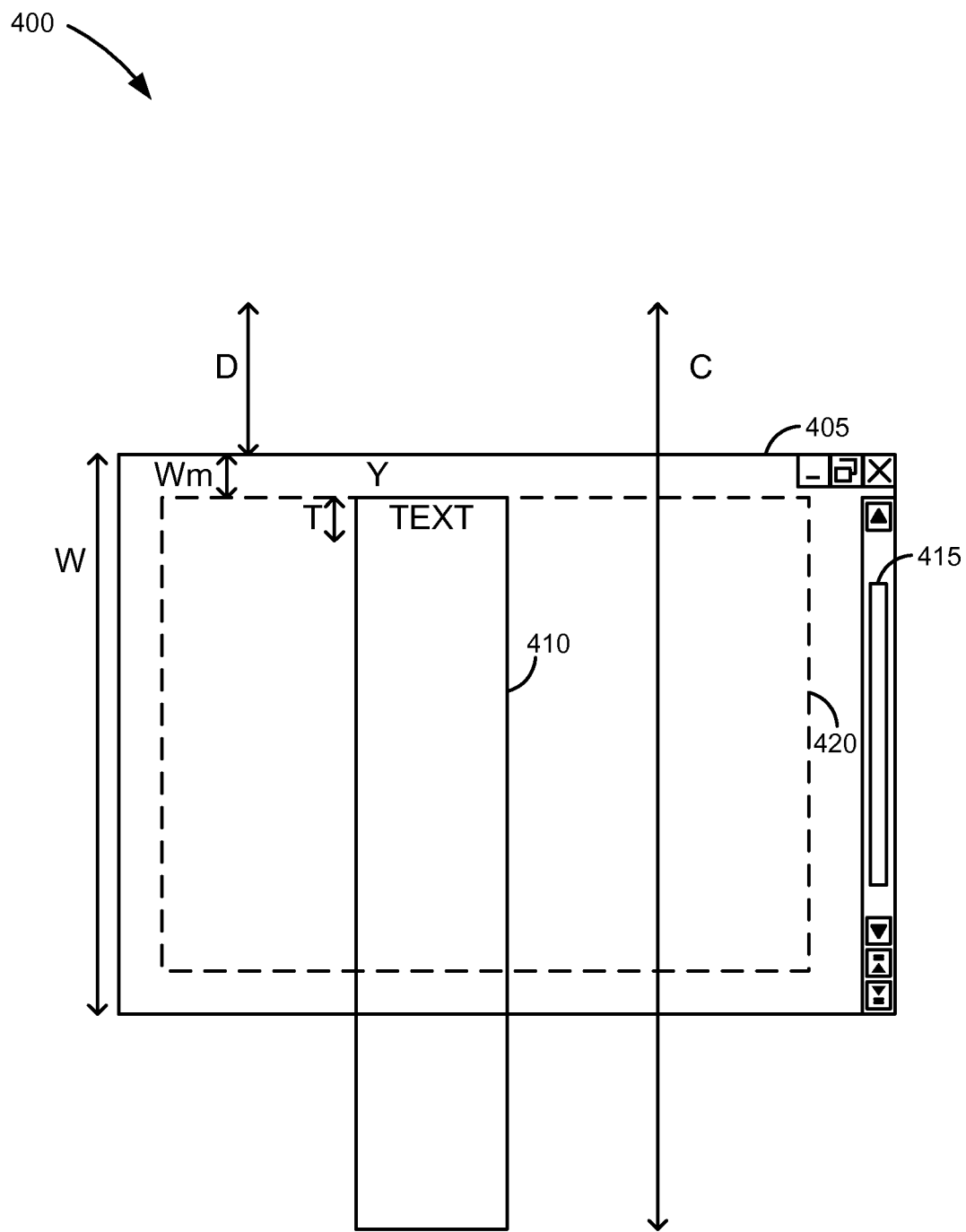
FIG. 4 is a block diagram of an exemplary UI display of a tabular report according to an embodiment of the invention.

FIG. 4 is a block diagram of an exemplary UI display according to an embodiment of the invention. Display 400 includes a display window 405, merged cells column of the table 410 and a scroll bar 415. The display 400 illustrates the position of the text in the merged cells column when the height of invisible cells over the top of the window 'D' is zero. When 'V' equals 'P', 'D' is zero, the text is displayed in a top portion of the merged cells column within the scrollable margin Wm 420 as shown in FIG. 4.

Figure 5:
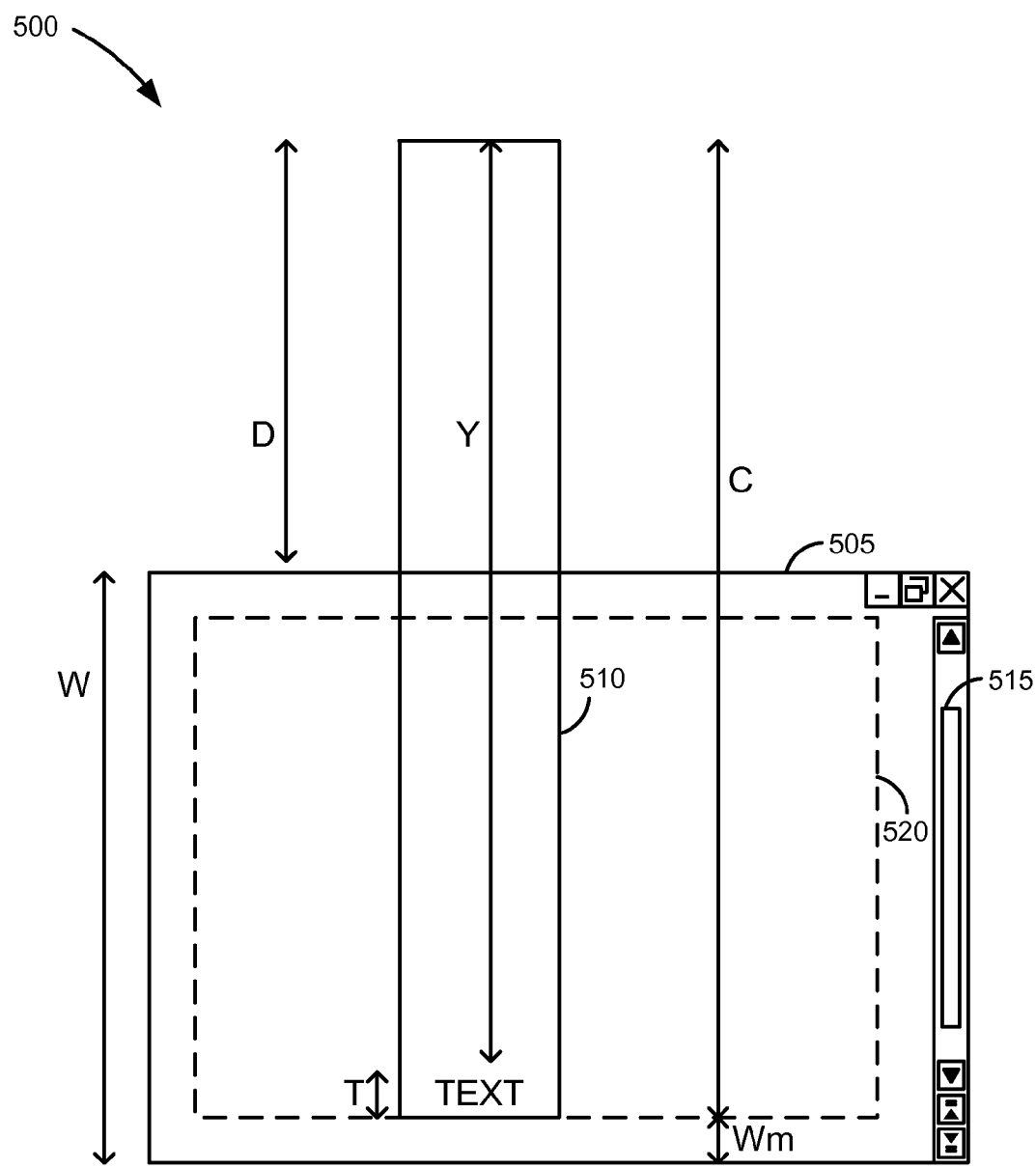
FIG. 5 is a block diagram of an exemplary UI display of a tabular report according to an embodiment of the invention.

FIG. 5 is a block diagram of an exemplary UI display of a tabular report according to an embodiment of the invention. Display 500 includes a display window 505 merged cells column of the table 510 and a scroll bar 515. Display 500 illustrates displaying the text in merged cells column to the bottom portion of the merged cells column. When display is scrolled to the bottom portion of the merged cells column 510, the height of the invisible cells over the top of the display window is equal to the height of the visible portion of cells.

In such case, at the margin of the window, $$D+W=C+Wm$$

$$D=C+Wm-W$$

Substituting in equation (1), $$Y=(C+Wm-W+Wm)*(C-T)/(C-W+2Wm)$$

$$Y=C-T$$

According to one embodiment, the position of the text 'Y' is proportional to a difference between merged cells column and height of text. In such a case, the text is scrolled to a bottom portion of the merged cells column.

Figure 6:
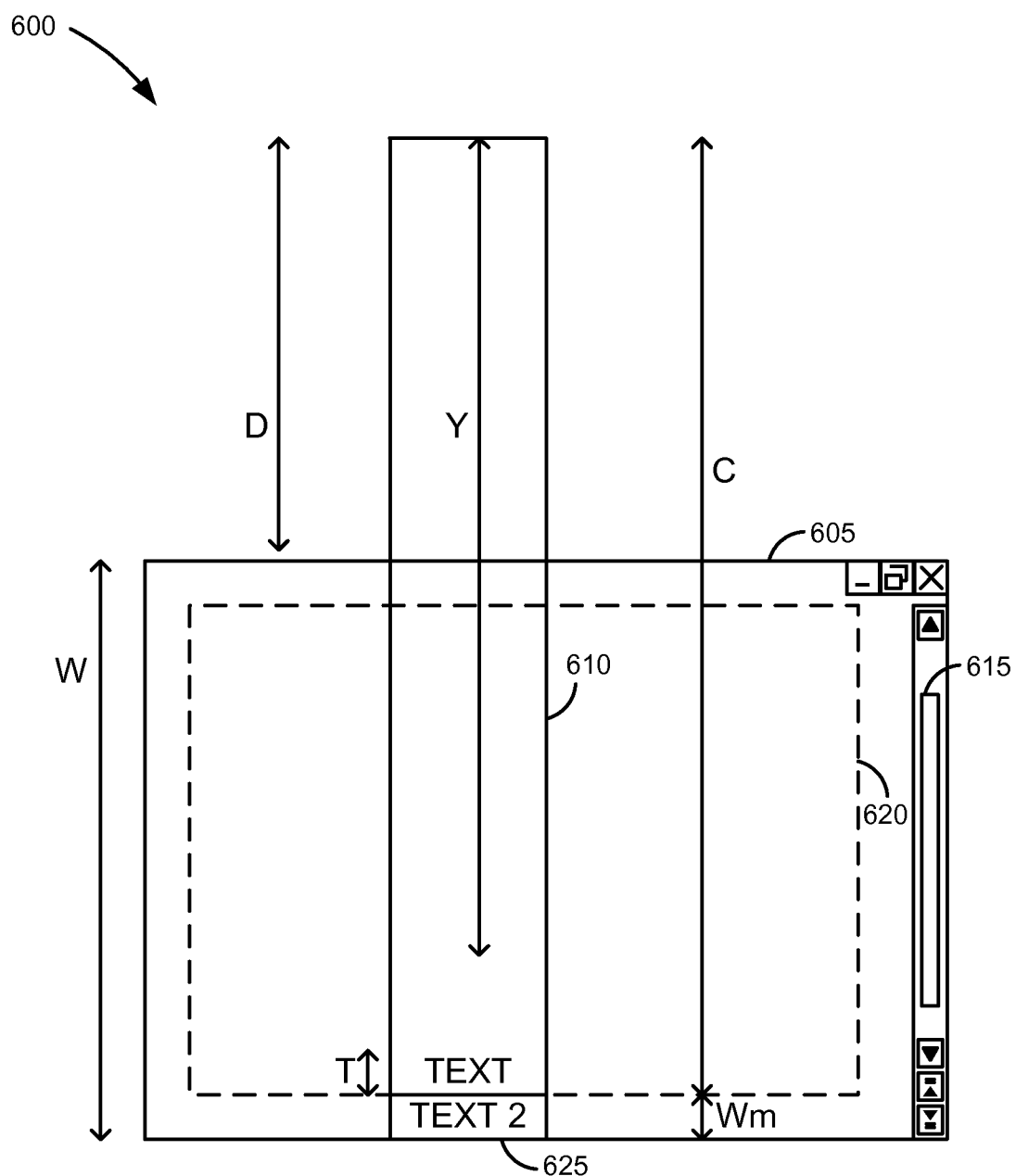
FIG. 6 is a block diagram of an exemplary business scenario of displaying text in other merged cells column according to an embodiment of the invention.

FIG. 6 is a block diagram of an exemplary UI display of displaying merged cell text between two sets of merged cells column in a column according to an embodiment of the invention. Display 600 includes a window 605, merged cells column of the table 610 and a scroll bar 615. The display 600 illustrates table parameters such as height of invisible cells over the top of window 'D', window size 'W', text height 'T' and height of merged cells column 'C'. The text in the merged cells column 610 is scrolled to a bottom portion of the merged cells column 610.

In one embodiment, on reaching the bottom portion of the merged cells column 610, the text in the second group of merged cells column 625 below the merged cells column 610 is also displayed in the window. The text in the second group of merged cells column "text 2" 625 is displayed according to the scrolling margin between the merged cells column 610 and second group of merged cells column "text 2" 625. Once the merged cell reaches the end of scrolling margin Wm 620, the second group of merged cells column "text 2" 625 is displayed.

Figure 7:
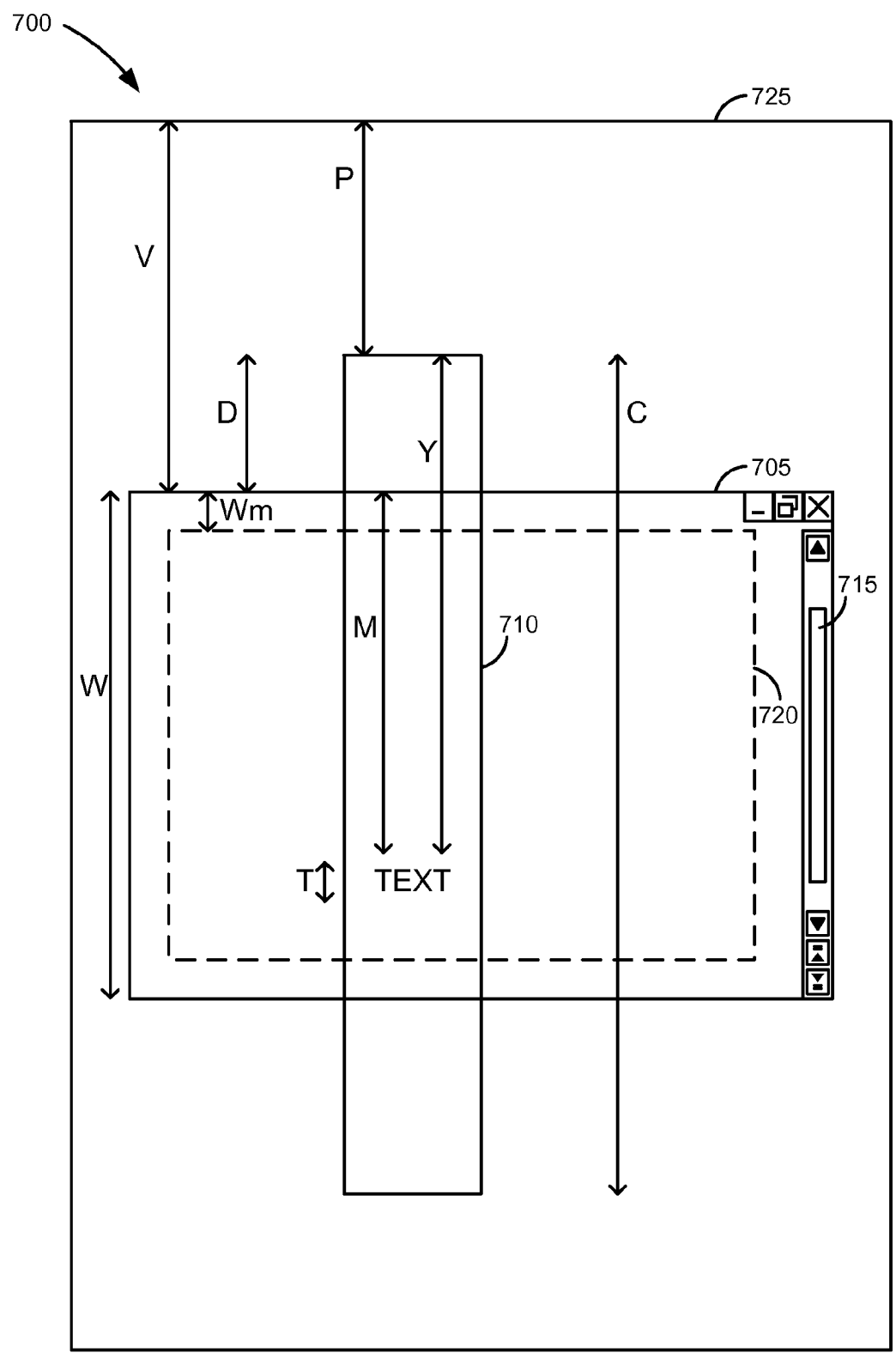
FIG. 7 is a block diagram illustrating exemplary table parameters for using the text in the merged column as a scroll bar according to an embodiment.

FIG. 7 is a block diagram illustrating exemplary table parameters for using the text in the merged column as a scroll bar according to an embodiment. Display 700 includes a window 705, merged cells column 710 of a tabular report 725 and a scroll bar 715. The display 700 illustrates table parameters such as, the position of the tabular report above the display window 'V', the position of the merged cells column in the tabular report 'P', the height of the invisible cells above the window 'D', window height 'W', text height 'T', the margin of the scrolling area in the window 'Wm' denoted by 720 and height of merged cells column 'C'.

Consider equation (1)

$$Y=(D+Wm)*(C-T)/(C-W+2Wm)$$

Referring to FIG. 7, it may be determined that $$Y=D+M \quad (2)$$

Where Y is the position of the text

M is the position to where the text may be scrolled in the visible portion of the display window Substituting equation (2) in equation (1) results in $$D=(D+Wm)*(C-T)/(C-W+2Wm)-M$$

$$D(1-(C-T))/(C-W+2Wm)=Wm(C-T)/(C-W+2Wm)-M$$

$$D(T-W+2Wm)/(C-W+2Wm)=Wm(C-T)/(C-W+2Wm)-M$$

Multiplying the equivalence by (C−W+2Wm) gives:

$$D(T-W+2Wm)=Wm(C-T)-(C-W+2Wm)M$$

So D=(Wm(C−T)−(C−W+2Wm) M)/(T−W+2Wm)

$$D=Wm(C-T)/(T-W+2Wm)-M(C-W+2Wm)/(T-W+2Wm)$$

Considering reference of the scrolled page V=P+D $$V=Wm(C-T)/(T-W+2Wm)-M(C-W+2Wm)/(T-W+2Wm)+P$$

As per the initial position "M1" of the text on the window, the page is at the position V1 with the formula $$V1=Wm(C-T)/(T-W+2Wm)-M1(C-W+2Wm)/(T-W+2Wm)+P$$

By replacing (T−W+2Wm) with −(W−2Wm−T)

$$V1=M1(C-W+2Wm)/(W-2Wm-T)+P-Wm(C-T)/(W-2Wm-T) \quad (3)$$

When the user scrolls the text, the text is at position M2 on the window. So when the user moves from (M2−M1), the page is scrolled to V2−V1=(M2−M1)(C−W+2Wm)/(W−2Wm−T)

For instance, consider FIG. 1B, the text position Y1=57.77 pixels, so M1=Y1−V+P=37.77 pixels.

Consider the user scrolls the text to the position described in FIG. 1C where Y2=563.33 and M2=193.33.

So when the text moves from (M2−M1), the page is scrolled to V2−V1=(M2−M1)(C−W+2Wm)/(W−2Wm−T) according to the equation (3).

By replacing by the values invariant during the scroll, gives:

$$V2-V1=(M2-M1)*(1060-380+2*20)/(380-2*20-20)$$

$V2-V1=(M2-M1)*2.25$

The scrolling of the text in the display window is $M2-M1=193.33-37.77=155,555$ pixels.

So the report is scrolled to $V2-V1=155.555*2.25=350$ pixels.

According to FIG. 1B, V=2040, so FIG. 1C displays a report with V=2040+350=2390.

Figure 8:
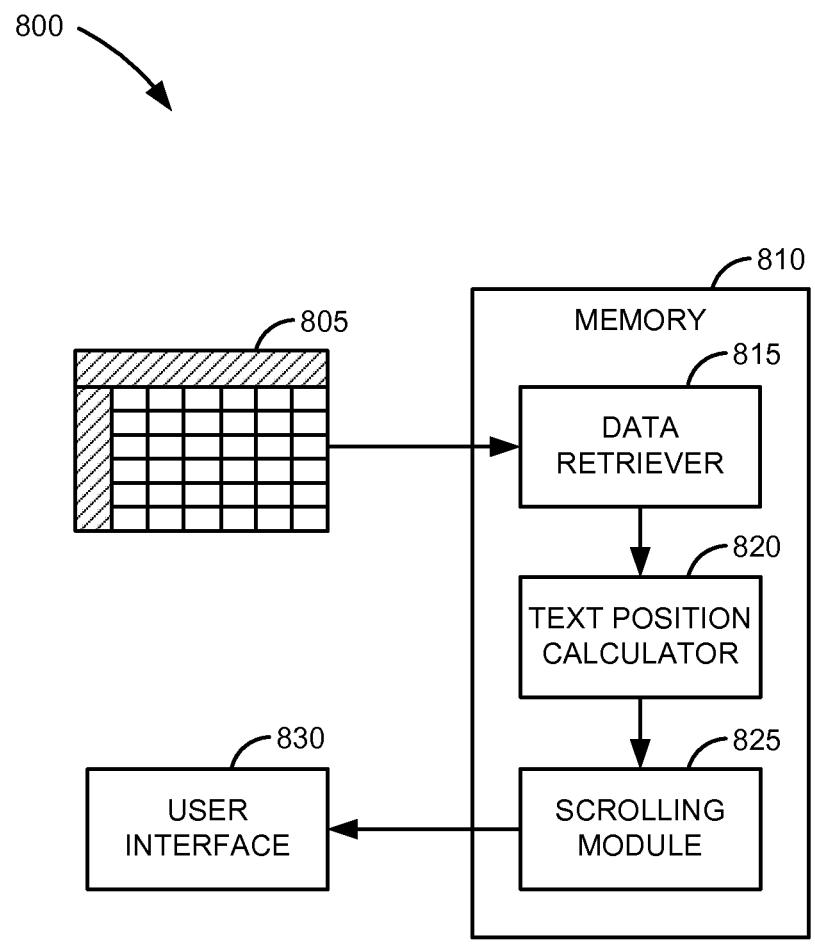
FIG. 8 is a block diagram of an exemplary system for displaying the text in the merged cells based on a position of a scroll bar according to an embodiment.

FIG. 8 is a block diagram of an exemplary system for displaying text in the merged cells based on a position of a scroll bar according to an embodiment. Computer system 800 includes a tabular report 805, a memory 810 and a user interface 830. The memory 810 further includes a data retriever 815, a text position calculator 820, and a scrolling module 825. A processor (not shown) in communication with the memory 810 includes instructions for the data retriever 815, the text position calculator 820, and the scrolling module 825 to perform required operations. The data retriever 815 retrieves one or more table parameters from a report. The one or more table parameters may be size of invisible cells in a display window, display window size, text size and size of cells. The text position calculator 820 calculates a position of the text in a visible portion of cells associated with the report based on the retrieved table parameters. According to an embodiment, the text position may be calculated for displaying text in merged cells column. According to another embodiment, the text position may be calculated for displaying text in merged cells row. The user interface 830 displays the text based on the position of a scroll bar. In one embodiment, the text in the merged cells is used to scroll the tabular report.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
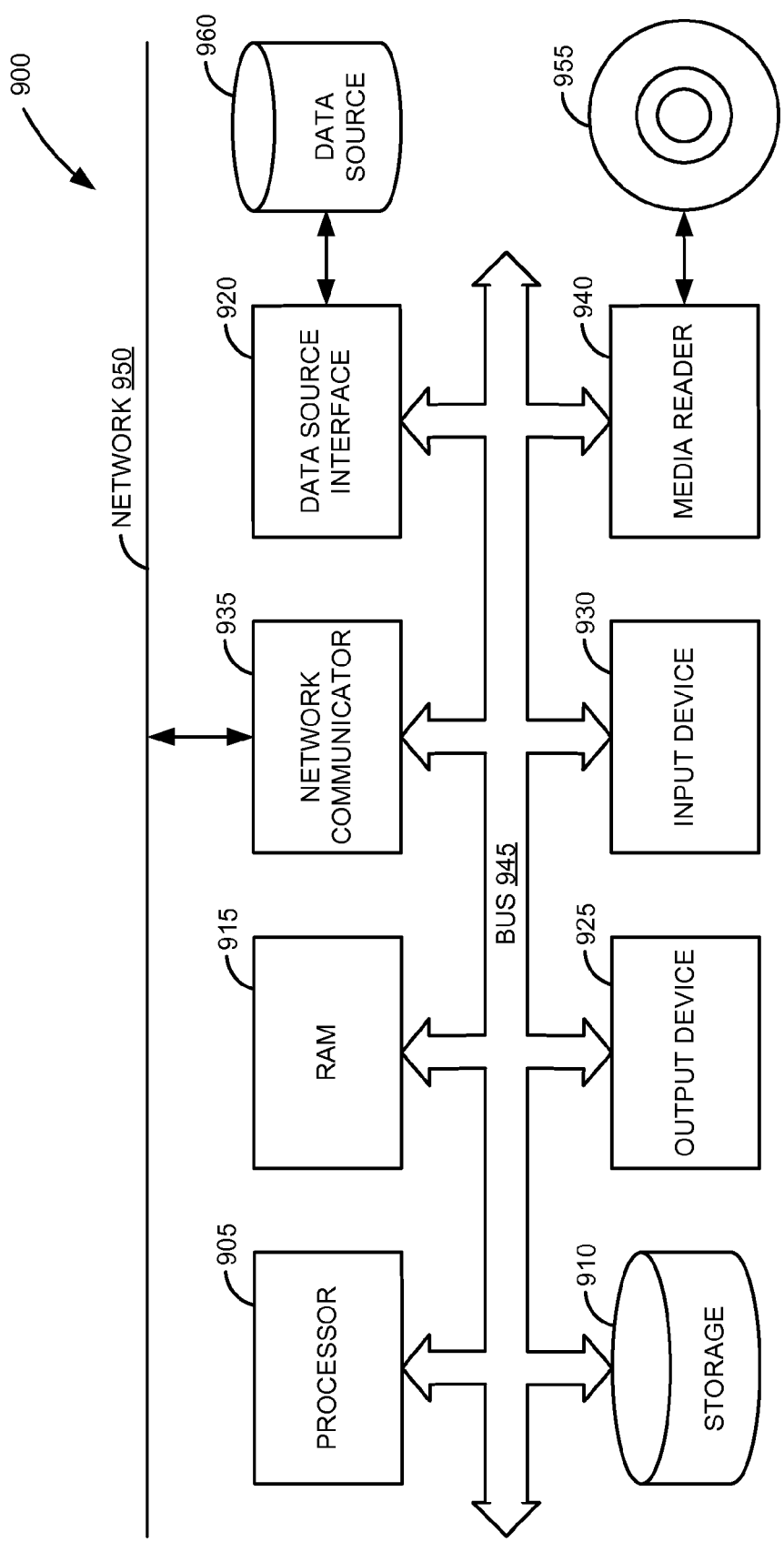
FIG. 9 is a block diagram of an exemplary computer system according an embodiment.

FIG. 9 is a block diagram of an exemplary computer system 900 according to an embodiment. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interacting with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however, that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium storing instructions, which when executed by a computer, cause the computer to:
   calculate a position for displaying a text in merged cells associated with a table, wherein the text is not entirely displayed in a portion of the merged cells that is visible in a display window,
   wherein the calculation is based on a size of invisible cells in the merged cells, a position of the merged cells, a size of the merged cells, the display window size and text size; and
   display the text at the calculated position in the merged cells.

2. The non-transitory computer readable storage medium of claim 1 storing instructions, which when executed by the computer, further cause the computer to: retrieve one or more table parameters associated with a plurality of vertically merged cells or a plurality of horizontally merged cells in the table.

3. The non-transitory computer readable storage medium of claim 1 storing instructions, which when executed by the computer, further cause the computer to: scroll the text horizontally or vertically in the merged cells when the table is scrolled horizontally or vertically by a scroll bar.

4. The non-transitory computer readable storage medium of claim 3, wherein scrolling the text in the merged cells is based on a logical behavior of the text.

5. The non-transitory computer readable storage medium of claim 1 storing instructions, which when executed by the computer, further cause the computer to: display the text at a top portion in the merged cells when height of the invisible cells is zero.

6. The non-transitory computer readable storage medium of claim 1 storing instructions, which when executed by the computer, further cause the computer to: display the text at a bottom portion in the merged cells when height of the invisible cells is a difference between height of the plurality of merged cells and height of the display window.

7. A computerized method for displaying a text in merged cells according to a position of a scroll bar, comprising:
   calculating a position for displaying the text in a plurality of merged cells associated with a table, wherein the text is not entirely displayed in a portion of the merged cells that is visible in a display window,
   wherein the calculation is based on a size of invisible cells in the merged cells, position of the merged cells, a size of the merged cells, the display window size and text size; and
   displaying the text at the calculated position in the merged cells.

8. The computerized method of claim 7, further comprising: retrieving one or more table parameters associated with a plurality of vertically merged cells or a plurality of horizontally merged cells in the table.

9. The computerized method of claim 7, further comprising: scrolling the text horizontally or vertically in the merged cells when the table is scrolled vertically or horizontally by the scroll bar.

10. The computerized method of claim 9, wherein scrolling the text in the plurality of merged cells is based on a logical behavior of the text.

11. The computerized method of claim 7, further comprising: displaying the text at a top portion in the merged cells when height of the invisible cells invisible is zero.

12. The computerized method of claim 7, further comprising: displaying the text at a bottom portion in the plurality of merged cells when height of the invisible cells is a difference between height of the plurality of merged cells and height of the display window.

13. A computer system for displaying text in merged cells according to a position of a scroll bar, comprising:
   a processor;
   a memory device in communication with the processor and the memory device storing instructions to:
     calculate a position for displaying the text a plurality of merged cells associated with a table, wherein the text is not entirely displayed in a portion of the merged cells that is visible in a display window,
     wherein the calculation is based a size of invisible cells in the merged cells, position of the merged cells, a size of the merged cells, the display size and text size; and
     display the text at the calculated position in the merged cells.

14. The computer system of claim 13, further comprising: retrieving one or more table parameters associated with a plurality of vertically merged cells or a plurality of horizontally merged cells in the table.

15. The computer system of claim 13, further comprising: displaying the text at a top portion in the merged cells when height of the invisible cells is zero.

16. The computer system of claim 13, further comprising: displaying the text at a bottom portion in the merged cells when height of the invisible cells invisible is a difference between height of the plurality of merged cells and height of the display window.

17. The computer system of claim 13, further comprising: scrolling the text horizontally or vertically in the merged cells when the table is scrolled horizontally or vertically by the scroll bar.

* * * * *